(12) United States Patent
Adelman et al.

(10) Patent No.: US 6,591,225 B1
(45) Date of Patent: Jul. 8, 2003

(54) SYSTEM FOR EVALUATING PERFORMANCE OF A COMBINED-CYCLE POWER PLANT

(75) Inventors: Stephen Thomas Adelman, Woodland, CA (US); Rodney Reves Gay, Woodland, CA (US)

(73) Assignee: General Electric Company, Schenectady, NY (US)

( * ) Notice: Subject to any disclaimer, the term of this patent is extended or adjusted under 35 U.S.C. 154(b) by 188 days.

(21) Appl. No.: 09/608,998

(22) Filed: Jun. 30, 2000

(51) Int. Cl.[7] .......................... G06F 11/30; G06F 15/00; G21C 17/00
(52) U.S. Cl. ..................... 702/182; 702/81; 700/32; 73/112
(58) Field of Search .......................... 702/81, 33, 108, 702/113–115, 119, 123, 182–185, 188; 700/32; 73/112; 701/99; 703/1, 2, 3, 4, 5, 17, 18, 23, 24, 26, 27; 60/660, 661, 662, 663, 664, 665, 666, 667

(56) References Cited

U.S. PATENT DOCUMENTS

| | | | | |
|---|---|---|---|---|
| 3,914,795 A | * | 10/1975 | Alliston et al. | 376/217 |
| 3,936,885 A | * | 2/1976 | Mutafelija | 376/217 |
| 4,297,848 A | * | 11/1981 | Silvestri, Jr. | 60/660 |
| 4,613,952 A | * | 9/1986 | McClanahan | 703/6 |
| 4,628,462 A | * | 12/1986 | Putman | 700/288 |
| 5,008,810 A | * | 4/1991 | Kessel et al. | 707/506 |
| 5,347,466 A | * | 9/1994 | Nichols et al. | 703/18 |
| 5,666,297 A | * | 9/1997 | Britt et al. | 703/18 |
| 5,886,895 A | * | 3/1999 | Kita et al. | 700/28 |
| 6,041,263 A | * | 3/2000 | Boston et al. | 700/32 |
| 6,230,480 B1 | * | 5/2001 | Rollins, III | 60/39.182 |
| 6,230,495 B1 | * | 5/2001 | Benesch et al. | 60/660 |

* cited by examiner

Primary Examiner—Marc S. Hoff
Assistant Examiner—Mary Catherine Baran
(74) Attorney, Agent, or Firm—Perkins Coie LLP

(57) ABSTRACT

A method and system for evaluating and optimizing the performance of a combined-cycle power plant. The optimization system combines a plant model that predicts performance of a combined-cycle power plant under varying environmental and operational conditions with an economic model that predicts the operating economics of the combined-cycle power plant. The optimization system predicts the operational control set points (i.e., variables) of a combined-cycle power plant to achieve a profitable operating condition for a particular combination of environmental, operational, and economic conditions.

24 Claims, 18 Drawing Sheets

Fig. 4A

| | Variable Name | Units | 1 | 2 |
|---|---|---|---|---|
| | **** *Plant* **** | | | |
| 1 | Ref Tamb | F | 59 | |
| 2 | Ref Pamb | PSIA | 14.7 | |
| | **** *Gas Turbine* **** | | | |
| 3 | Ref GT Gross Pwr NG | MW | 263.3 | 263.3 |
| 4 | GT HeatRate Gas Ref | Btu/kWh | 9279 | 9279 |
| 5 | Ref H2O NOx Inj NG | ratio | 0 | 0 |
| 6 | GT Texh Ref | F | 1125 | 1125 |
| 7 | Ref Total H2O Inj | klb/h | 0 | 0 |
| 8 | Ref GT Exh Flow | klb/h | 5212 | 5212 |
| 9 | Ref GT Tin | F | 50 | 50 |
| 10 | DB Ref. Energy Flow | MEBtu/h | 0 | 0 |
| 11 | Ref HP Steam Flow | klb/h | 613.5 | 613.5 |
| 12 | Ref IP Steam Flow | klb/h | 598.3 | 598.3 |
| 13 | Ref LP Steam Flow | klb/h | 63.5 | 63.5 |
| 14 | Ref GT Aux Pwr | MW | 2.25 | 2.25 |
| 15 | Ref HRSG Aux Power | MW | 2.75 | 2.75 |
| | **** *Steam Turbine* **** | | | |
| 16 | Ref ST Gross Power | MW | 279.8 | |
| 17 | Ref Throttle Flow | klb/h | 1228 | |
| 18 | Ref IP Adm Flow | klb/h | 1388 | |
| 19 | Ref LP Adm Flow | klb/h | 141.8 | |
| 20 | Ref Pcond | PSIA | 1.2 | |
| 21 | Ref Cond Duty | MEBtu/h | 1244 | |
| 22 | Ref HP Extract Flow | klb/h | 0 | |
| 23 | Ref IP Extract Flow | klb/h | 0 | |
| 24 | Ref LP Extract Flow | klb/h | 0 | |
| 25 | Ref CT Fans On | integer | 1 | |
| 26 | Ref CT Pumps On | integer | 1 | |
| 27 | Ref ST Aux Power | MW | 1 | |

| | Variable Name | Units | 1 | 2 |
|---|---|---|---|---|
| | **** *Plant* **** | | | |
| 1 | Max HPHead To HPProc Flow | klb/h | 0 | |
| 2 | Max HPHead To IPHead Flow | klb/h | 0 | |
| 3 | Max IPHead To LPHead Flow | klb/h | 0 | |
| | **** *Gas Turbine* **** | | | |
| 4 | Min GT Gross Power | MW | 0 | 0 |
| 5 | Max GT Gross Power | MW | 300 | 300 |
| 6 | Max GT Texh | F | 1200 | 1200 |
| 7 | Max Duct Fuel Energy | MBtu/h | 100 | 100 |
| 8 | Min Duct Fuel Energy | MBtu/h | 50 | 50 |
| 9 | Max GT Gas Fuel Flow | klb/h | 200 | 200 |
| 10 | Min GT Gas Fuel Flow | klb/h | 0 | 0 |
| 11 | Min Peak Power | MW | 0 | 0 |
| 12 | Max Peak Power | klb/h | 0 | 0 |
| 13 | Min Power Aug Stm Flow | klb/h | 0 | 0 |
| 14 | Max Power Aug Stm Flow | klb/h | 9999 | 9999 |
| 15 | Max HP Steam Flow | klb/h | 0 | 0 |
| 16 | Min IPHead to GT Flow | klb/h | 100 | 100 |
| 17 | Max IPHead to GT Flow | klb/h | 0 | 0 |
| 18 | Min HPProc to GT Flow | klb/h | 0 | 0 |
| 19 | Max HPProc to GT Flow | klb/h | 100 | 100 |
| | **** *Steam Turbine* **** | | | |
| 20 | Max ST Gross Power | MW | 300 | |
| 21 | Min Pcond | PSIA | 0.725 | |
| 22 | Max Throttle Flow | klb/h | 2000 | |
| 23 | Max IP Adm Flow | klb/h | 2000 | |
| 24 | Max LP Adm Flow | klb/h | 2000 | |
| 25 | Max ST Exhaust Flow | klb/h | 2000 | |
| 26 | Min ST Exhaust Flow | klb/h | 200 | |
| 27 | Max HPProc Extract Flow | klb/h | 0 | |
| 28 | Max IP Extract Flow | klb/h | 0 | |
| 29 | Max ST LPHead Flow | klb/h | 0 | |
| 30 | Min HP Letdown to Cond Flow | klb/h | 0 | |
| 31 | Max HP Letdown to Cond Flow | klb/h | 2000 | |
| 32 | Min IP Letdown to Cond Flow | klb/h | 0 | |
| 33 | Max IP Letdown to Cond Flow | klb/h | 2000 | |
| 34 | Min LP Letdown to Cond Flow | klb/h | 0 | |
| 35 | Max LP Letdown to Cond Flow | klb/h | 2000 | |
| 36 | Min CT Fans On | integer | 1 | |
| 37 | Max CT Fans On | integer | 2 | |
| 38 | Min CT Pumps On | integer | 1 | |

604

| Variable Name | Units | 1 | 2 |
|---|---|---|---|
| **** Plant **** | | | |
| HP Letdown Source Switch | integer | 0 | |
| **** Gas Turbine **** | | | |
| Min IGV | angle | 40 | 40 |
| Max IGV | angle | 89 | 89 |
| Power Frac@Min IGV | fraction | 0.4 | 0.4 |
| Wexh Frac@Min IGV | fraction | 0.6 | 0.6 |
| IGV Span Fraction | fraction | 0.5 | 0.5 |
| IGV ELDrop1 Fraction | fraction | 0.25 | 0.25 |
| Max IGV Fuel Penalty | fraction | 0.02 | 0.02 |
| UF Inflection Const | fraction | 0.17 | 0.17 |
| UF Yintercept | fraction | 0.21 | 0.21 |
| Yintercept/Tin Const | fraction/degree | 4e-005 | 4e-005 |
| WexhUFP Const | klb/h | 0 | 0 |
| TexhIGV Const | degree/angle | 1.85 | 1.85 |
| TexhTfire Const | degree/MW | 22 | 22 |
| TexhPeak Const | degree/MW | 22 | 22 |
| TexhPaug Const | degree/klb/h | 1 | 1 |
| Exit Temp Drop | F | 25 | 25 |
| NOX Stm/Wet Flag | flag | 1 | 1 |
| H2Oinj/Pwr Const | MW/klb/h | 0 | 0 |
| Fuel/Paug Const | MBtu/klb/h | 0.9 | 0.9 |
| IPHead to GT Fract | ratio | 1 | 1 |
| HP/Texh Const | ratio | 0.24 | 0.24 |
| HP/Wexh Const | ratio | 0.13 | 0.13 |
| HP/Eexh Const | ratio | 0 | 0 |
| HP Blowdown Frac | fraction | 0.01 | 0.01 |
| IP/Texh Const | ratio | 0 | 0 |
| IP/Wexh Const | ratio | 0.0244 | 0.0244 |
| IP/Eexh Const | ratio | 0 | 0 |
| IP Duct Eff | fraction | 0 | 0 |
| IP Blowdown Frac | fraction | 0.01 | 0.01 |
| LP/Texh Const | ratio | 0 | 0 |
| LP/Wexh Const | ratio | 0.05 | 0.05 |
| LP/Eexh Const | ratio | 0 | 0 |
| LP Duct Eff | fraction | 0 | 0 |
| LP Blowdown Frac | fraction | 0.01 | 0.01 |
| User HP Steam | flag | 0 | 0 |
| User IP Steam | flag | 0 | 0 |
| User LP Steam | flag | 0 | 0 |
| GT PwrAux Const | MW | 0.5 | 0.5 |

| | Variable Name | Units | 1 | 2 |
|---|---|---|---|---|
| | *** Plant *** | | | |
| 1 | Plant Profit | $/h | 620 | |
| 2 | Total Revenues | $/h | 179 | |
| 3 | Total Costs | $/h | 117 | |
| 4 | Plant Heatrate Gross LHV | Btu/kWh | 692 | |
| 5 | Plant Gross Power | MW | 365 | |
| 6 | Plant Heatrate Gross HHV | Btu/kWh | 7731 | |
| 7 | Plant Net Power | MW | 359 | |
| 8 | Total Plant Fuel HC LHV | MBtu/h | 253 | |
| 9 | Plant Heatrate Net LHV | Btu/kWh | 704 | |
| 10 | Total Plant Fuel HC HHV | MBtu/h | 267 | |
| 11 | Plant Heatrate Net HHV | Btu/kWh | 743 | |
| 12 | Electricity Revenue | $/h | 179 | |
| 13 | HPHead to HPProc Letdown Flow | klb/h | 0 | |
| 14 | Gas Sales Revenue | $/h | 0 | |
| 15 | HPHead to IPHead Letdown Flow | klb/h | 0 | |
| 16 | IPHead to LPHead Letdown Flow | klb/h | 0 | |
| 17 | Steam Sales Revenue | $/h | 0 | |
| 18 | Total Electricity Costs | $/h | 0 | |
| 19 | HPHead to LPHead Letdown Flow | klb/h | 0 | |
| 20 | Total Gas Costs | $/h | 0 | |
| 21 | Total Oil Costs | $/h | 0 | |
| 22 | Total H2 Costs | $/h | 200 | |
| 23 | Total Maint. Costs | $/h | 0 | |
| 24 | Fixed Costs | $/h | 0 | |
| 25 | HPDesup to HPProc Flow | klb/h | 6.6 | |
| 26 | Total Makeup Costs | $/h | 0 | |
| 27 | HP to HPProc Desup Water Flow | klb/h | 13 | |
| 28 | Total Makeup Water Flow | klb/h | 257 | |
| 29 | GT Fuel HC HHV | MBtu/h | 0 | |
| 30 | HPDesup to LPHead Flow | klb/h | 0 | |
| 31 | DB HC HHV | MBtu/h | 0 | |
| 32 | HP to LP Desup Water Flow | klb/h | 0 | |
| 33 | Total Boiler Fuel HC HHV | MBtu/h | 0 | |
| 34 | IPDesup to IPHead Flow | klb/h | 0 | |
| 35 | Plant Boiler Steam Production | klb/h | 0 | |
| 36 | IPDesup to LPHead Flow | klb/h | 0 | |
| 37 | Plant Auxiliary Power | MW | 5.7 | |
| 38 | LPDesup Water Flow | klb/h | 0 | |
| 39 | Unmodelled HP Stm | klb/h | 0 | |

SYSTEM FOR EVALUATING PERFORMANCE OF A COMBINED-CYCLE POWER PLANT

TECHNICAL FIELD

The present disclosure relates generally to a system for evaluating the performance of the combined-cycle power plant and, more particularly, to a system that includes a generic model that factors in various possible configurations of a combined-cycle power plant.

BACKGROUND

The profitable operation of combined-cycle power plants is a difficult and complex problem to evaluate and optimize. The performance of modern combined-cycle power plants is strongly influenced by various factors including environmental factors (e.g., ambient temperature and pressure) and operational factors (e.g., power production levels and cogeneration steam load requirements). In the past, software tools were used to evaluate and optimize the operation of combined-cycle power plants. These software tools, however, were custom developed for each particular power plant. The software tools may have used standard software programs that were developed to predict performance of combined-cycle power plants under various conditions. Nevertheless, extensive customization was needed to integrate the effects of the predicted performance with calculations needed to optimize the operational economics of the power plant. It is a very difficult and cumbersome task to customize a plant model so that the optimal values for those operational control set points that an operator is normally free to adjust are identified for any given set of environmental, load, and economic conditions. Because of the cost associated with such customization, the custom software tools may have used simplified models which may have resulted in less than acceptable accuracy.

It would be desirable to have a software tool that could be used to evaluate optimal performance of a combined-cycle power plant under various conditions. Such a software tool should allow a user to specify the configuration of the plant. When properly evaluating and optimizing the operation of a combined-cycle power plant, the software tool should account for not only environmental and operational factors but, also key economic parameters (e.g., cost of fuel, price of electricity, and steam or heat export credits).

BRIEF DESCRIPTION OF THE DRAWINGS

FIGS. 4A–4B illustrate the process of providing the optimization system with a combined-cycle power plant configuration and economic formation.

FIGS. 6A–6D illustrate the process by which an operator modifies the model variables.

FIGS. 7A–7D illustrate the process by which an operator modifies the input variables.

FIG. 8A–8B illustrate the process by which an operator can view the output variables.

DETAILED DESCRIPTION

Figure 1:
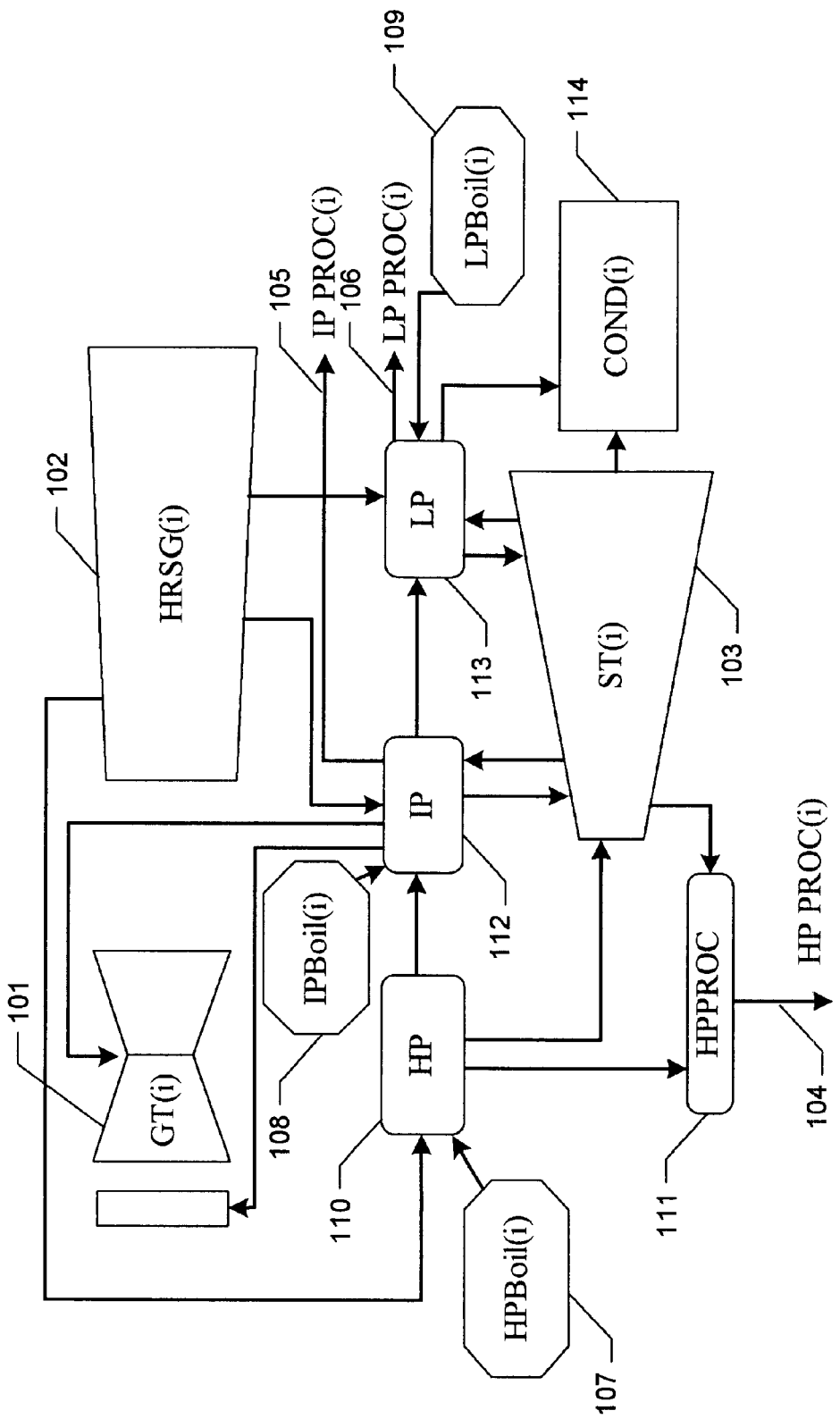
FIG. 1 is a block diagram illustrating a generic view of a combined-cycle power plant.

A method and system for evaluating and optimizing the performance of a combined-cycle power plant is provided. The optimization system combines a plant model that predicts performance of a combined-cycle power plant under varying environmental and operational conditions with an economic model that predicts the operating economics of the combined-cycle power plant. The optimization system predicts the operational control set points (i.e., variables) of a combined-cycle power plant to achieve a profitable operating condition for a particular combination of environmental, operational, and economic conditions. In one embodiment, the optimization system provides a set of modeling equations to represent the plant configuration and economic conditions. These equations representing the plant configuration are adapted to factor in various possible configurations of a combined-cycle power plant. The optimization system allows a user (e.g., plant manager, engineer, and plant operator) to specify the configuration (current or desired) of the power plant. The optimization system adjusts the equations based on this configuration by either modifying the equations themselves or by setting variables that are used by the equations. For example, if the configuration includes three gas turbines, then the generated equations will accommodate all three gas turbines. The optimization system allows the user to specify the subset of possible factors (i.e., variables) that can be adjusted to reflect different operational, environmental, and economic conditions. Once a user has specified a value or range of values of various factors, then the optimization system analyzes the equations to arrive at a set of operating conditions that will result in optimal performance. Optimal performance may be evaluated in various ways such as maximization of overall profit of the power plant.

In one embodiment, the optimization system uses linear equations in the model. As a result of using linear equations, standard linear equation solvers may be used to identify an optimum (or near optimum) set of operating conditions. Many aspects of the operation of a combined-cycle power plant, however, are nonlinear in nature. To account for these nonlinear aspects, the optimization system models the nonlinear aspects using piece-wise linear equations. The use of piece-wise linear equations allows standard linear equation solvers to be used even though the underlying aspects may be nonlinear in nature. The optimization system provides key performance equations for gas turbines (e.g., for heat rate, power, exhaust flow, and exhaust temperature), for steam turbine efficiency, for duct burner and auxiliary boiler efficiency, and for condenser performance (based on condenser load and cooling water temperature).

The optimization system provides a standard set of plant model and case variables. The plant model variables represent the configuration of the plant. The optimization system allows the user to specify the configuration of the plant by selecting from various possible components and interconnections of those components. Once the configuration is specified, the user can set the plant model variables for that configuration. For example, the plant model variables may include tuning, operation limits, and constants (e.g., maximum steam turbine throttle flow). After setting the plant model variables, the user can define various "what-if" cases that specify different operational, environmental, and economic conditions. The user can then evaluate these cases to predict the resulting effect on the operation of the power plant. In one embodiment, the optimization system allows the user to specify the subset of plant model and case variables that the user is interested in controlling. The optimization system will adjust its user interface to allow the user to see and manipulate only those variables that are designated of interest and thus exposed to the operator.

FIG. 1 is a block diagram illustrating a generic view of a combined-cycle power plant. The generic view of a combined-cycle power plant includes one or more gas turbines (GT) 101, one or more heat-recovery steam generators (HRSG) 102, and one or more steam turbines (ST) 103. In addition, the power plant includes one or more of high-pressure, intermediate-pressure, and low-pressure process flows (HPPROC, IPPROC, LPPROC) 104, 105, 106 and one or more of high-pressure, intermediate-pressure, and low-pressure boilers (HPBoil, IPBoil, LPBoil) 107, 108, 109. The modeled power plant includes four steam headers (HP, HPPROC, IP, LP) 110, 111, 112, 113. Any number of steam turbines (at three different pressure levels) may be modeled. The letdown flows from the HP and IP headers to each steam turbine condenser 114 is allowed by the optimization system, but not shown in this Figure.

In one embodiment, the optimization system identifies the plant operating condition that maximizes plant net income (i.e., revenues minus expenses). Revenues may be derived from the sale of electricity, gas, and process steam, and expenses may result from purchases of electricity, gas, oil, hydrogen, and makeup water and from maintenance and fixed costs. To define a case, a user specifies associated prices and costs along with indication of the minimum and maximum amount that may be purchased or sold. The net income equation is used as the objective function whose value is to be maximized. The optimization system may use other objective functions depending upon the variables or resources that are to be optimized.

As discussed above, the optimization system uses a piece-wise linear representation to represent operations that are nonlinear in nature. To create the linear equations, numerical values are needed for all input variables, except for those input variables referred to as optimize variables. The optimization system determines the values for the optimize variables that will result in maximizing the objective function. The optimization system may allow the user to specify values for some of optimize variables to further constrain the solution. The optimize variables may include the gas turbine power, steam turbine power, maximum plant power, maximum plant fuel energy, process flows, duct burner flows, letdown flows, and boiler steam generation rates. For some variables, such as turbine power levels, duct burner fuel requirements, and boiler steam generation, the optimization system may allow the user to specify whether the equipment is on or off. If the equipment is on, then the optimization system may set its operating condition to anywhere between the minimum and maximum specified values. The optimization system may allow the user to specify whether the inlet heating, inlet cooling, power augmentation steam, combined-cycle operation, duct burner operation, and peak firing are on or off.

Figure 2:
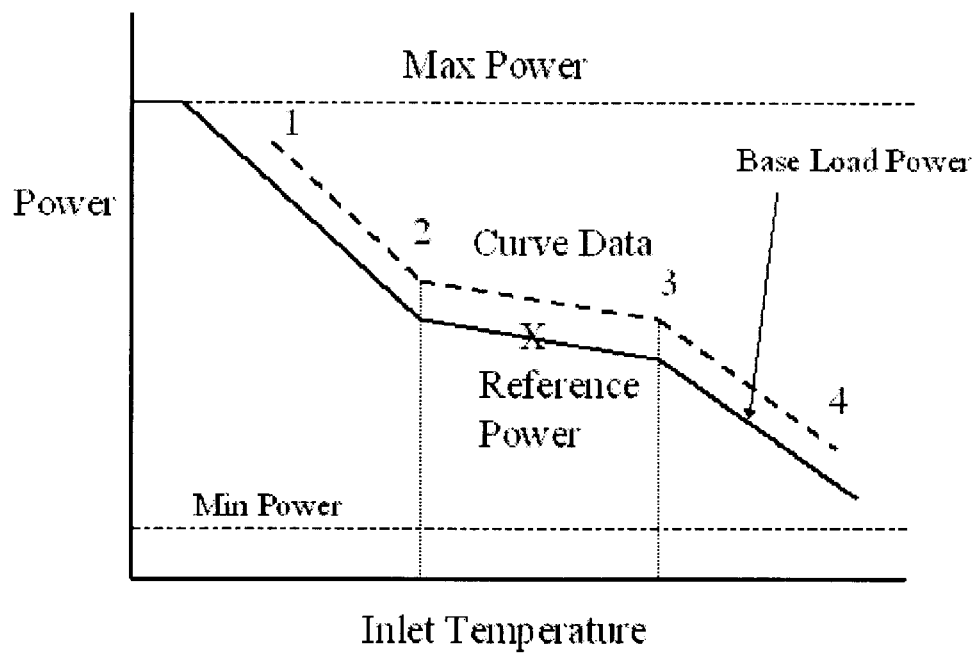
FIG. 2 provides a graph of the inlet temperature versus power.

The optimization system models gas turbines at baseload using performance curves supplied by the user. The user enters baseload performance data at different ambient temperatures. This data consists of the table of baseload values for the parameters of gross power generation, gross heat rate, exhaust temperature, and exhaust mass flow versus inlet temperature. FIG. 2 provides a graph of the inlet temperature versus power. The optimization system multiplies operator-specified data by a "tuning" factor to derive absolute values used for baseload performance. (The solid line illustrates the actual baseload power predicted by the optimization system.) For example, if the operator enters a value of 1.0 for baseload power at 59 degrees and the tuning data is 40 MW at 59 degrees, then the optimization system uses a multiplier of 40 on the baseload data to predict the actual baseload performance. The optimization system may model the actual power generated by a gas turbine by the following equation:

GT_PWRGRS(I)=GT_PWRGRS_BASE(I)*SONTIN2(I)+

PEAK_POWER(1)-UNDER_FIRE_POWER(I)-

(POWER_IGV_CONST1(I)*DELTA1_IGV(I)+

POWER_IGV_CONST2(I)*DELTA2_IGV(I))+

H2OINJ_PWR_CONST(I)*(NOXH2O_M(I)-

NOXH2O_BASE_M(I)+POWER_AUG_H2O_M(I));

| Variable | Description |
|---|---|
| GT_PWRGRS_BASE(I) | baseload powers computed as a function of inlet temperature |
| SONTIN2(I) | inlet on or off |
| PEAK_POWER(I) | peak power from over firing |
| UNDER_FIRE_POWER(I) | under fire power from under firing |
| POWER_IGV_CONST1(I) | power drop per degree of inlet guide vane angle, over range 1 |
| DELTA1_IGV(I) | change in angle, over range 1 |
| POWER_IGV_CONST2(I) | power drop per degree of inlet guide vane angle, over range 2 |
| DELTA2_IGV(I) | change in angle, over range 2 |
| H2OINJ_PWR_CONST(I) | change in power per pound of steam injected |
| NOXH2O_M(I) | steam injection rate for NOX reduction |
| NOXH2O_BASE_M(I) | baseload NOX steam injection rate |
| POWER_AUG_H2O_M(I) | power augmentation steam injection rate |

Figure 3:
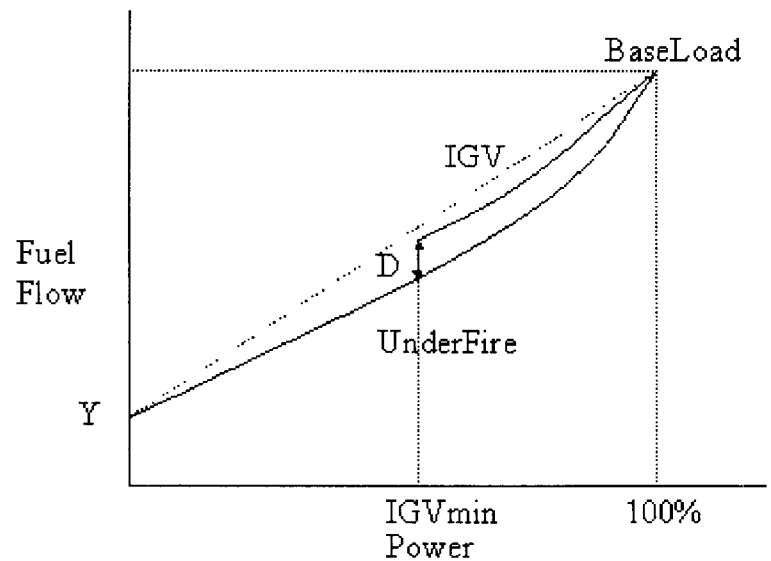
FIG. 3 is a graph illustrating fuel flow versus inlet guide vane reduction power.

The optimization system computes the gas turbine fuel flow at baseload from the input data of the heat rate versus inlet temperature multiplied by a tuning multiplier. The optimization system reduces the fuel flow at part load based on a piece-wise linear representation of fuel consumption versus load fraction. FIG. 3 is a graph illustrating fuel flow versus percent power. The operator enters the value for the maximum power reduction that can be achieved by the guide vane and for the fuel flow fraction at zero power. The operator also supplies the difference between the inlet guide vane control and under firing control by entering the percent fuel flow difference at minimum inlet guide vane power. The fuel flow at zero power varies with gas turbine air inlet temperature by the relationship:

YIntcptT(I) = YIntcpt_TUN(I) + GT_YIN_CONST(I) * (GT_TIN(I) − GT_TIN_REF(I));

| Variable | Description |
|---|---|
| Yintcpt_TUN(I) | fuel flow at zero power and at reference inlet temperature |
| GT_YIN_CONST(I) | change in zero power fuel flow with inlet temperature |
| GT_TIN(I) | inlet temperature |
| GT_TIN_REF(I) | reference inlet temperature |

The optimization system may optimize on the amount of under-firing, guide vane position, pea firing, and power augmentation steam. If inlet cooling or inlet heating is allowed by the operator, the optimization system will compute the minimum and maximum inlet temperatures possible. In one embodiment, the optimization system considers the lowest temperature achievable by inlet cooling, the ambient temperature, and the highest inlet temperature achievable by inlet heating and selects that temperature which maximizes the objective function.

The optimization system models heat recovery steam generation as being linearly dependent on gas turbine exhaust temperature, gas turbine exhaust energy, gas turbine exhaust mass flow, and duct burner fuel energy. The optimization system represents the high-pressure steam generation by the following equation:

$$\begin{aligned}
\text{HRSG\_HPHEAD\_M(I)} = \,&\text{HRSG\_HPHEAD\_M\_REF(I)} * \\
&\text{SHRSGON(I)} + \text{HP\_TEXH\_CONST(I)} * (\text{GT\_EXH\_T(I)} - \\
&\text{GT\_EXH\_T\_REF(I)}*\text{SHRSGON(I)}) + \text{HP\_EEXH\_CONST(I)} * \\
&(\text{GT\_EXH\_E(I)} - \text{GT\_EXH\_E\_REF(I)}*\text{SHRSGON(I)}) + \\
&\text{HP\_WEXH\_CONST(I)} * (\text{GT\_WEXH(I)} - \text{GT\_WEXH\_REF(I)}* \\
&\text{SHRSGON(I)}) + \text{HPSTM\_USER(I)} + \text{DB\_STM\_M(I)} - \\
&\text{DB\_STM\_M\_REF(I)};
\end{aligned}$$

| Variable | Description |
| --- | --- |
| HRSG_HPHEAD_M_REF(I) | reference value of steam flow |
| SHRSGON(I) | on/off flag for the HRSG |
| HP_TEXH_CONST(I) | change in HP steam per exhaust temperature change |
| GT_EXH_T(I) | gas turbine average exhaust temperature |
| GT_EXH_T_REF(I) | reference value of gas turbine exhaust temperature |
| HP_EEXH_CONST(I) | change in HP steam per change in exhaust gas energy |
| GT_EXH_E(I) | gas turbine exhaust energy flow rate |
| GT_EXH_E_REF(I) | reference value of gas turbine exhaust energy |
| HP_WEXH_CONST(I) | change in HP steam per change in gas mass flow rate |
| GT_WEXH(I) | gas turbine exhaust flow rate |
| GT_WEXH_REF(I) | reference value of gas turbine exhaust flow |
| HPSTM_USER(I) | user input steam flow which adds to HP steam |
| DB_STM_M(I) | HP steam produced by duct burner |
| DB_STM_M_REF(I) | reference value of HP steam generated by duct burner |

If the gas turbine conditions change from reference conditions, then the optimization system changes the steam flow linearly with the changing conditions. The optimization system maintains separate equations for high-pressure, intermediate pressure, and low pressure steam generation.

The optimization system models the steam turbine power as a piece-wise linear function of inlet throttle steam flow that is linearly dependent upon admission flows, extraction flows, and condenser pressure. The steam turbine is modeled by the following equation:

$$\begin{aligned}
&\text{PWR\_HT\_CONST} * (\text{ST\_PWRGRS(I)} - \\
&\text{ST\_PWRGRS\_REF(I)}*\text{STON(I)}) = \text{HPHEAD\_ST\_CONST(I)} * \\
&(\text{HPHEAD\_ST\_M(I)} - \text{HPHEAD\_ST\_M\_REF(I)}*\text{STON(I)}) - \\
&\text{HPHEAD\_STPWR\_P\_CONST(I)} * (\text{HPHEAD\_ST\_P(I)} - \\
&\text{HPHEAD\_ST\_P\_REF(I)}*\text{STON(I)}) - \text{ST\_HPPROC\_CONST(I)} * \\
&(\text{ST\_HPPROC\_M(I)} - \text{ST\_HPPROC\_M\_REF(I)}*\text{STON(I)}) + \\
&\text{IPHEAD\_ST\_CONST(I)} * (\text{IPHEAD\_ST\_M(I)} - \\
&\text{IPHEAD\_ST\_M\_REF(I)}*\text{STON(I)}) - \text{ST\_IPHEAD\_CONST(I)} * \\
&(\text{ST\_IPHEAD\_M(I)} - \text{ST\_IPHEAD\_M\_REF(I)}*\text{STON(I)}) + \\
&\text{LPHEAD\_ST\_CONST(I)} * (\text{LPHEAD\_ST\_M(I)} - \\
&\text{LPHEAD\_ST\_M\_REF(I)}*\text{STON(I)}) - \text{ST\_LPHEAD\_CONST(I)} * \\
&(\text{ST\_LPHEAD\_M(I)} - \text{ST\_LPHEAD\_M\_REF(I)}*\text{STON(I)}) - \\
&\text{ST\_EXHLOSS(I)} + \text{STPWR\_SLACK(I)} - \text{ST\_PCOND\_CONST(I)} * \\
&(\text{PCOND(I)} - \text{PCOND\_REF(I)}*\text{STON(I)});
\end{aligned}$$

| Factor | Description |
| --- | --- |
| HPHEAD_ST_CONST(I) | power/throttle flow |
| HPHEAD_ST_M(I) | throttle flow |
| HPHEAD_ST_M_REF(I) | reference throttle flow |
| STON(I) | steam turbine on/off flag |
| HPHEAD_STPWR_P_CONST(I) | power/throttle pressure |
| HPHEAD_ST_P(I) | throttle pressure |
| HPHEAD_ST_P_REF(I) | reference throttle pressure |
| ST_HPPROC_CONST(I) | power/HP extraction flow constant |
| ST_HPPROC_M(I) | HP extraction flow |
| ST_HPPROC_M_REF(I) | reference HP extraction flow |
| IPHEAD_ST_CONST(I) | power/HP admission flow constant |
| IPHEAD_ST_M(I) | HP admission flow |
| IPHEAD_ST_M_REF(I) | reference HP admission flow |
| LPHEAD_ST_CONST(I) | power/LP admission flow |
| LPHEAD_ST_M(I) | LP admission flow |
| LPHEAD_ST_M_REF(I) | reference LP admission flow |
| ST_IPHEAD_CONST(I) | power/IP extraction flow |
| ST_IPHEAD_M(I) | IP extraction flow |
| ST_IPHEAD_M_REF(I) | reference IP extraction flow |
| ST_EXHLOSS(I) | exhaust loss in flow |
| STPWR_SLACK(I) | slack constant, driven to zero by numerical solver |
| ST_PCOND_CONST(I) | power/condenser pressure |
| PCOND(I) | condenser pressure |
| PCOND_REF(I) | reference condenser pressure |

The optimization system models steam headers at four pressure levels (HP, HPPROC, IP, and LP) and allows the operator to enter an enthalpy to describe the steam at the HP, IP and LP pressure levels. The HPPROC header is assumed to be at the enthalpy of the first steam turbine extraction, ST_HPPROC_ENTH(I). Since there may be more than one steam turbine, the optimization system uses the average of the steam turbine extraction enthalpies as the HPPROC enthalpy. The optimization system models letdown steam flows for the following:

HP Header to HPPROC
HP Header to Each Condenser
HP Header to Each HP Process
HP Header to IP Header
IP Header to LP Header
IP Header to Each Condenser
IP Header to Each IP Process
LP Header to Each Condenser
LP Header to Each LP Process The optimization system assumes that each of these letdown flows is associated with a desuperheater that mixes feedwater with the higher-pressure steam so as to match the enthalpy at the lower-pressure steam. The required feedwater flow depends upon the steam flow, the steam enthalpies, and the feedwater enthalpy. All of these enthalpies may be input by the operator. The optimization system determines the steam flow unless the operator optionally specifies the flow. All of these letdown flows have maximums that may be set by the operator, and all of these flows may be set to a value specified by the operator or left for the equation solver to optimize.

The optimization system allows an operator to add custom equations to the equation set by inputting equations in LINGO format or any other equation solver format, which is a format with commercially available equation solvers. These equations are added to the automatically generated equation set for the plant model. The optimization system allows an operator to enter the text, "USER" as the input value for any required input variable. In this case, the optimization system will not require a numerical input value for the variable, but will expect the user to supply a value or linear expression in the operator-supplied equation file. The following is an example of equations specified by an operator:

Input:

FIXED_COST(3)=USER

Equations:

PLANT_COST=1000000000;

INTEREST_RATE=0.10;

HOURS_IN_YEAR=365*24,

FIXED_COST(3)=INTEREST_RATE*PLANT_COST/ HOURS_IN_YEAR;

These equations calculate the interest expense for the plant cost. The optimization system adds the calculated value of FIXED_COST(3) to the objective function to adjust the net income for the plant.

Figure 4A:
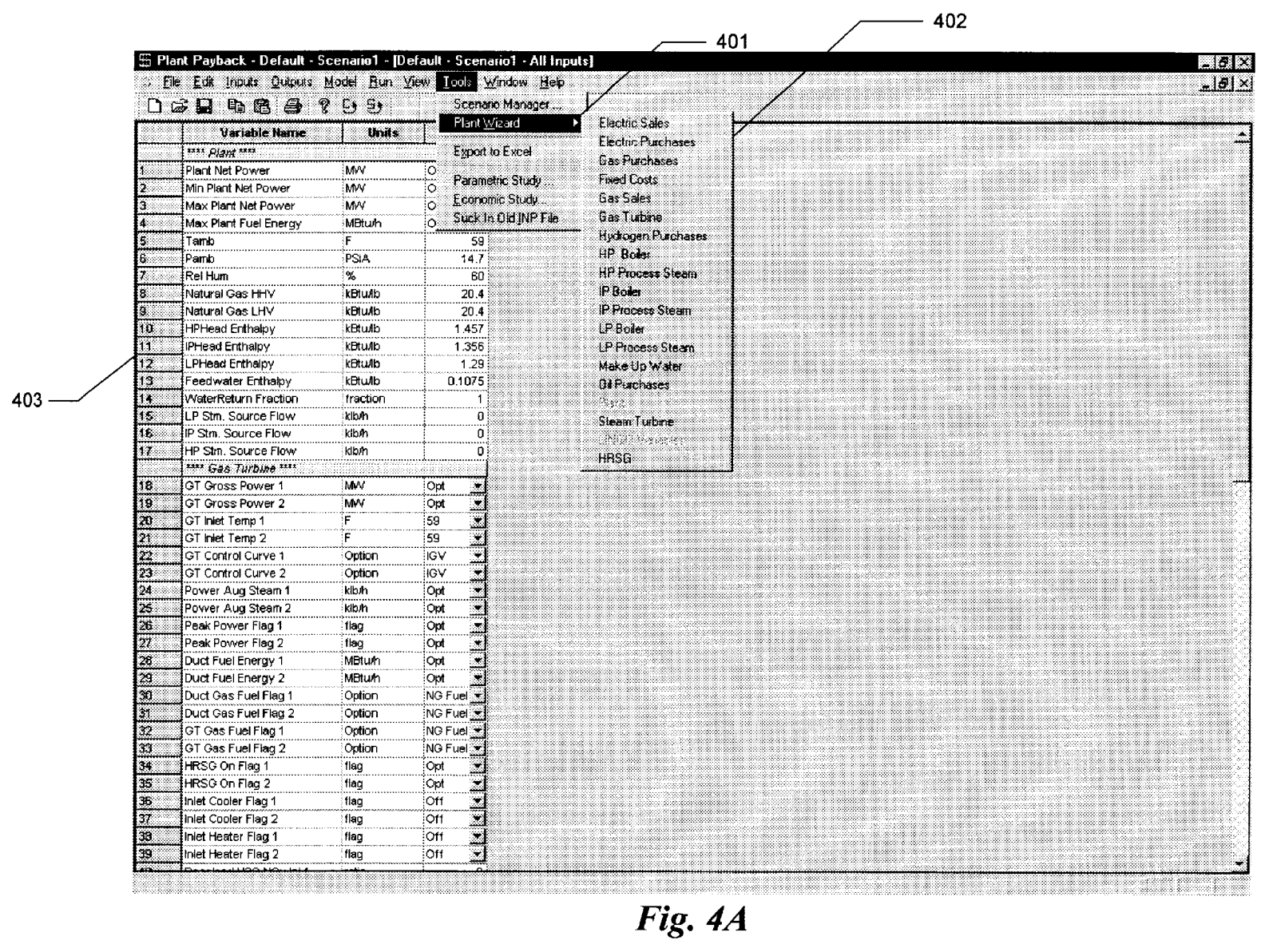
Figure 4B:
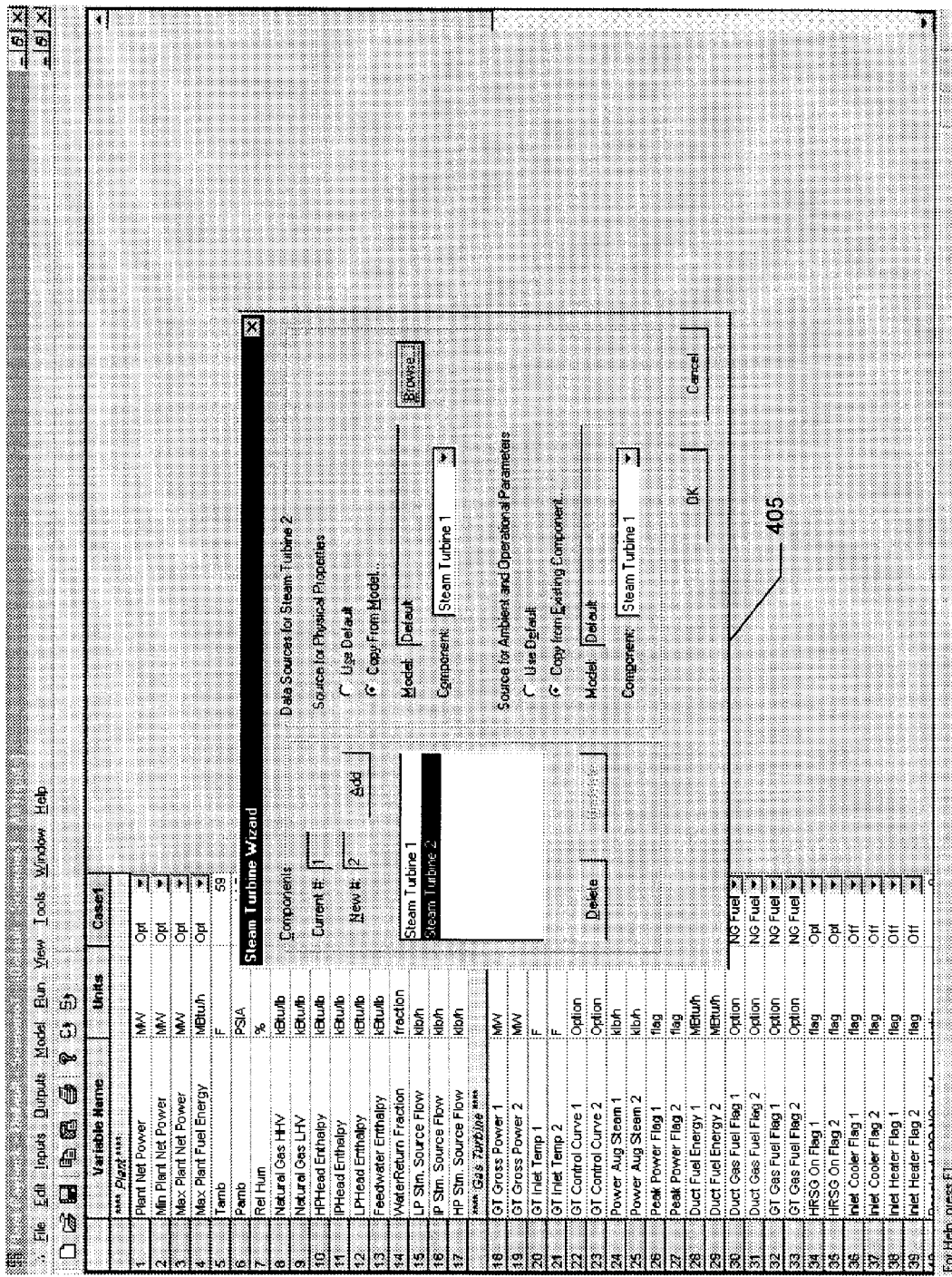

FIGS. 4A–8B illustrate a user interface for the optimization system in one embodiment. FIGS. 4A–4B illustrate the process of providing the optimization system with a combined-cycle power plant configuration and economic information. The user interface includes a "plant wizard" menu item 401 through which an operator can specify components reflecting the plant configuration and various economic conditions. The various configuration components may include boilers, gas turbines, and steam turbines. The operator can set the number of each type of configuration component and its characteristics and connections as appropriate. The various economic components may include various purchasers of electric power and various costs. FIGS. 4A also displays a portion of the grid 403 that contains the various settings for input variables associated with each component. In this example, the plant has two gas turbines whose input variables are shown in rows 18–39. As shown in row 18, the gross power for the gas turbine is set to "opt," which means that the optimization system will select a value for the gross power variable that will optimize the objective function. The optimization system displays dialog box 405 of FIG. 4B when the user selects the steam turbine menu item of menu 402. Through this dialog box, the operator can add a new steam turbine to the configuration of the plant. The optimization system uses similar dialog boxes to specify the other configuration and economic components of the power plant.

Figure 5A:
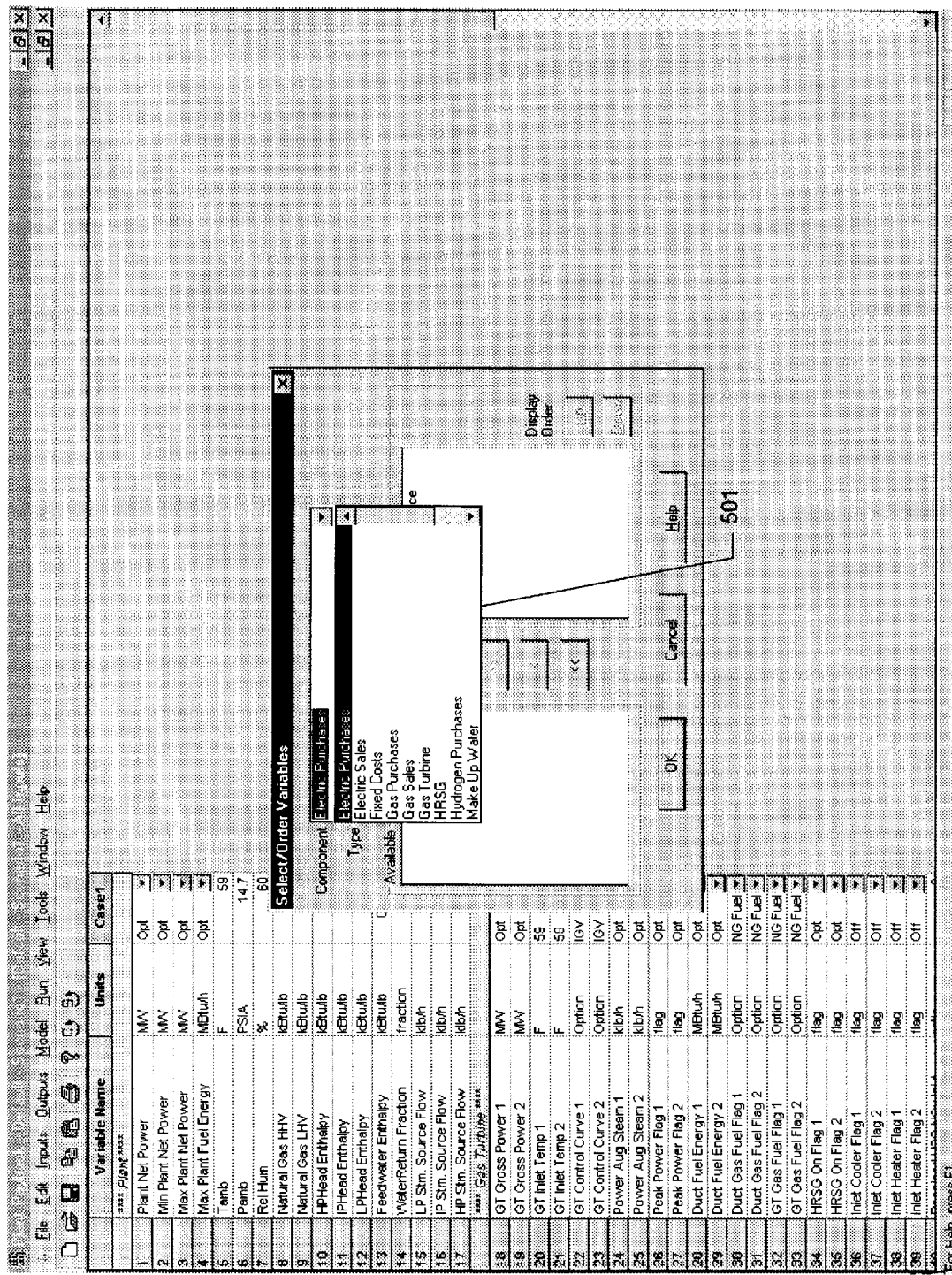
FIGS. 5A–5C illustrate the process by which an operator selects which variables should be exposed by the optimization system.
Figure 5B:
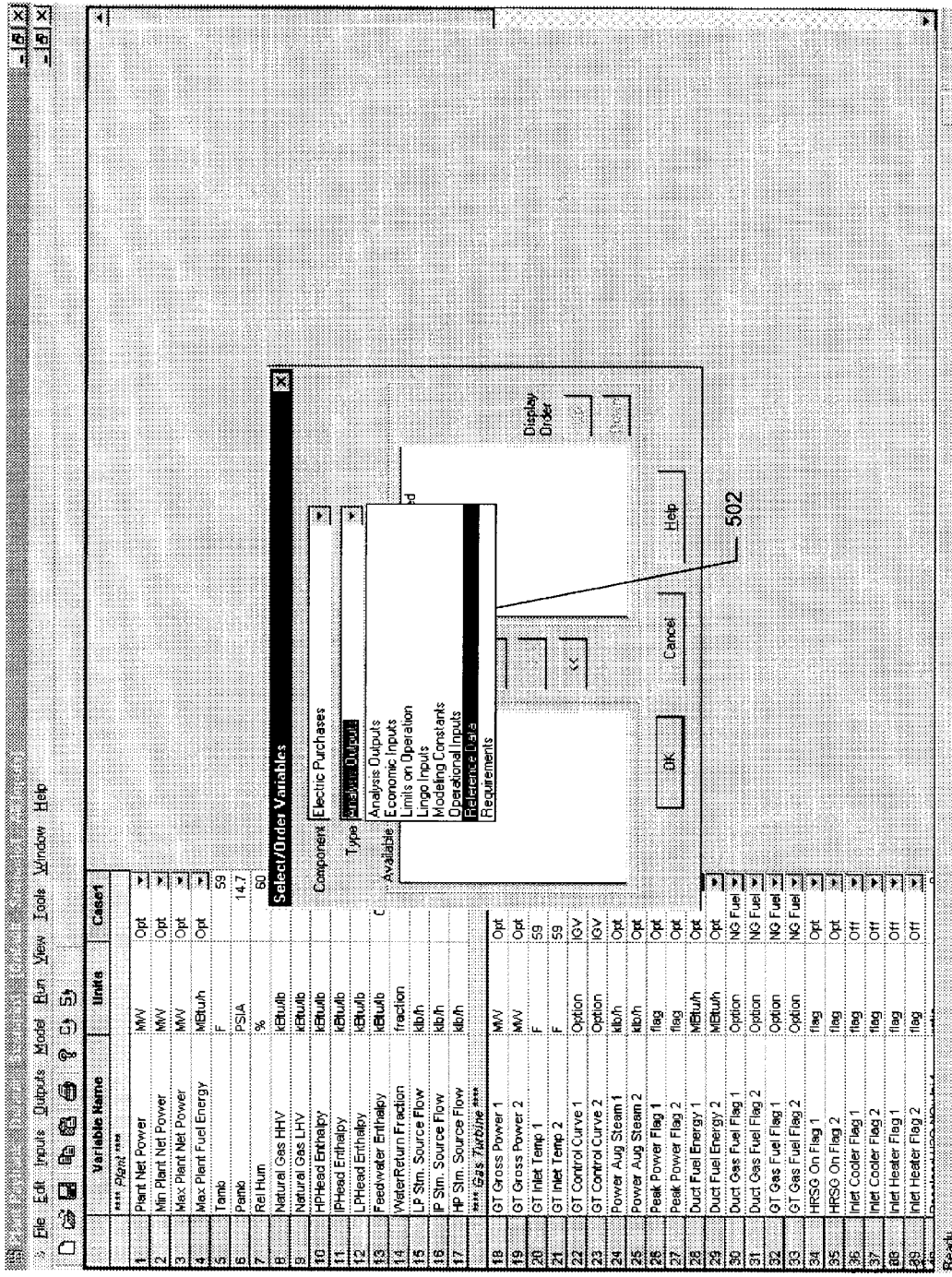
Figure 5C:
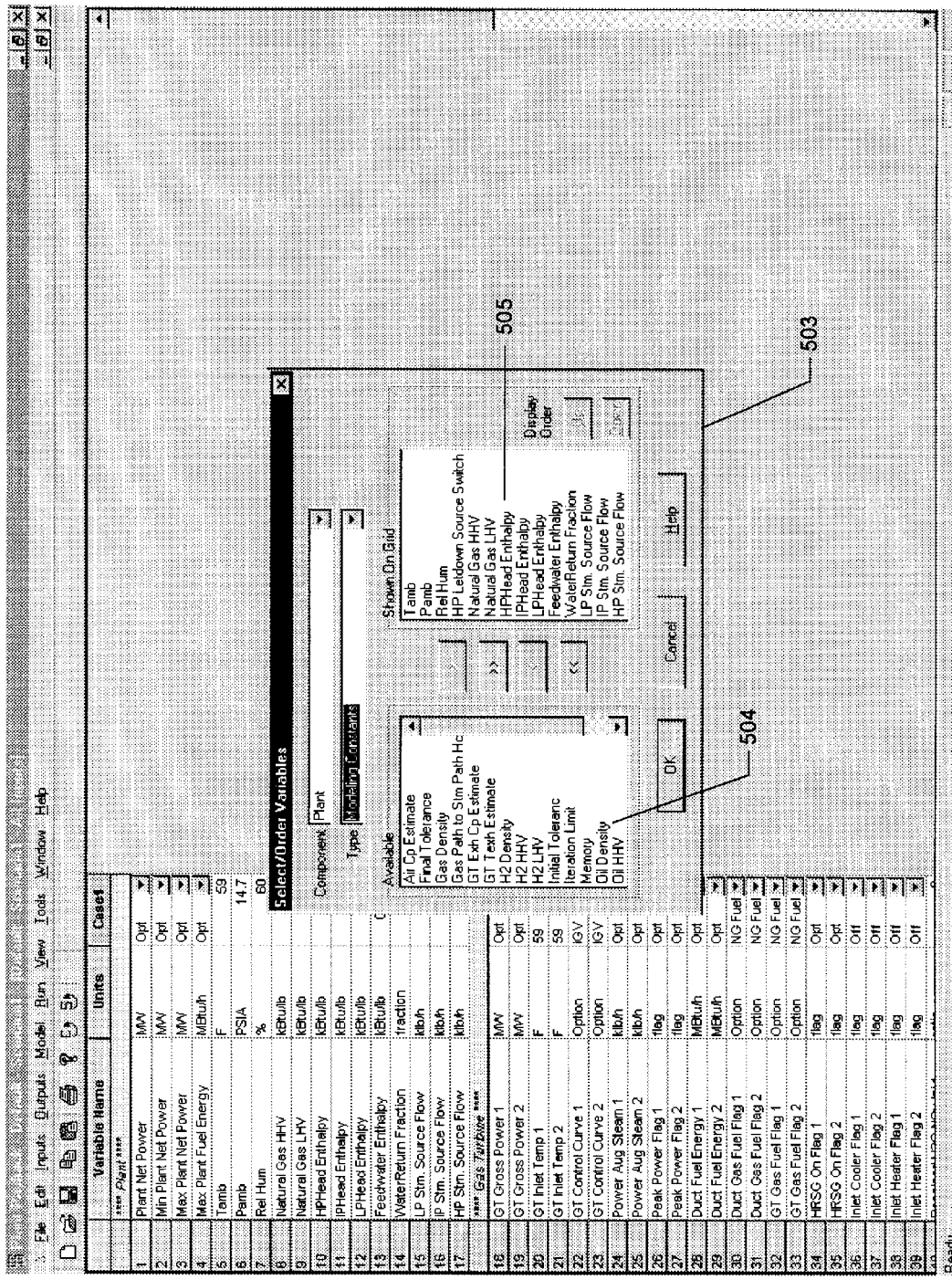

FIGS. 5A–5C illustrate the process by which a user selects which variables should be exposed by the optimization system. The user can modify the value of an input variable that is exposed and see the value of an output variable that is exposed. The dialog box contains a drop-down list 501 of FIG. 5A for selecting a component, and the dialog box contains a drop-down list 502 of FIG. 5B for selecting a type of variable for that component. The types of variables included analysis outputs, economic inputs, limits on operation, Lingo inputs, modeling constants, operational inputs, reference data, and requirements. Once the user selects the component and variable type, the optimization system displays a dialog box similar to that of dialog box 503 of FIG. 5C. The optimization system displays dialog box 503 after the user has selected the plant component and the modeling constants variable type. The optimization system displays the available modeling constants in area 504, and the modeling constants that are currently selected to be exposed in area 505. The optimization system allows the user to select a variable and change its exposure. The possible configuration components can be exposed in a similar way.

Figure 6A:
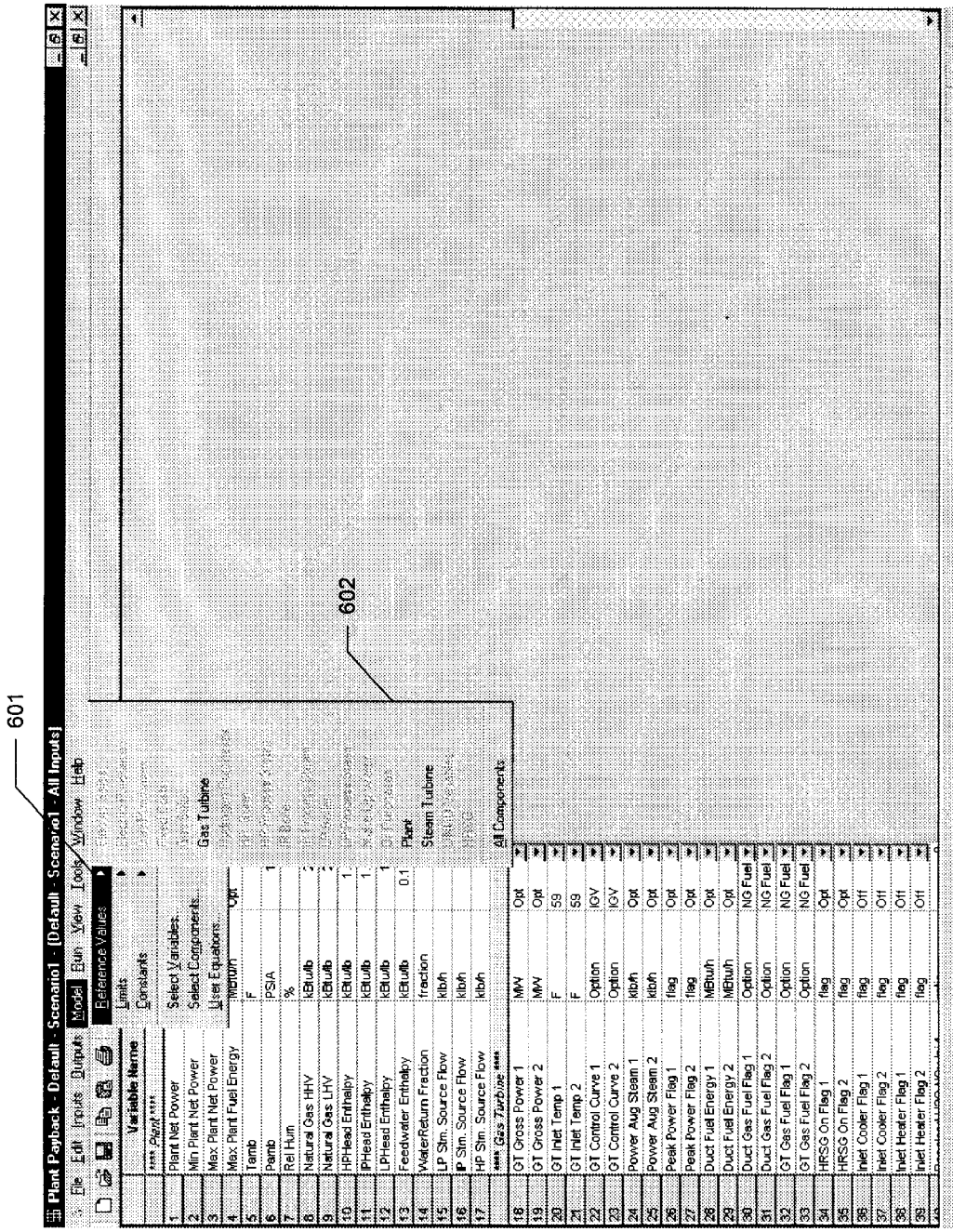

FIGS. 6A–6D illustrate the process by which a user modifies the model variables. The optimization system provides a model menu through which the user can select the type of model variable to be modified. The model variables include reference values, limits, and constants as shown in menu 601. When the type of model variable is selected, the optimization system displays a menu 602 with the names of the components to which the selected type of model variable applies. Grid 603 of FIG. 6B illustrates the display of reference values for all the components. In this example, only the plant, gas turbine, and steam turbine components have reference variables. The user uses this grid to change the values of the reference variables. Grid 604 of FIG. 6C illustrates the limits of operation variables for various components; and grid 605 of FIG. 6D illustrates the modeling constants for various components. The columns of the grids numbered "1" and "2" correspond to the two gas turbines that have been configured into the power plant.

Figure 7A:
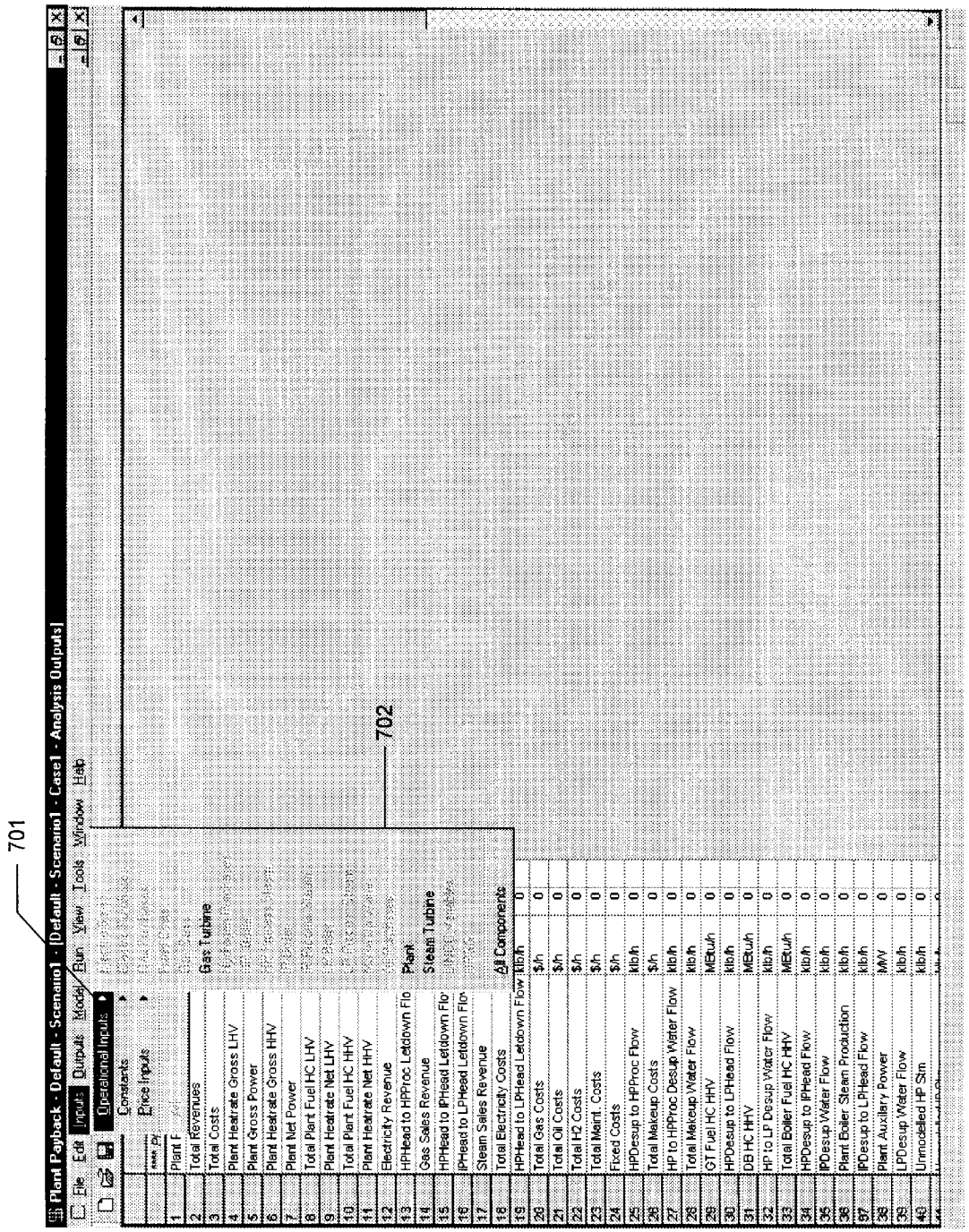
Figure 7B:
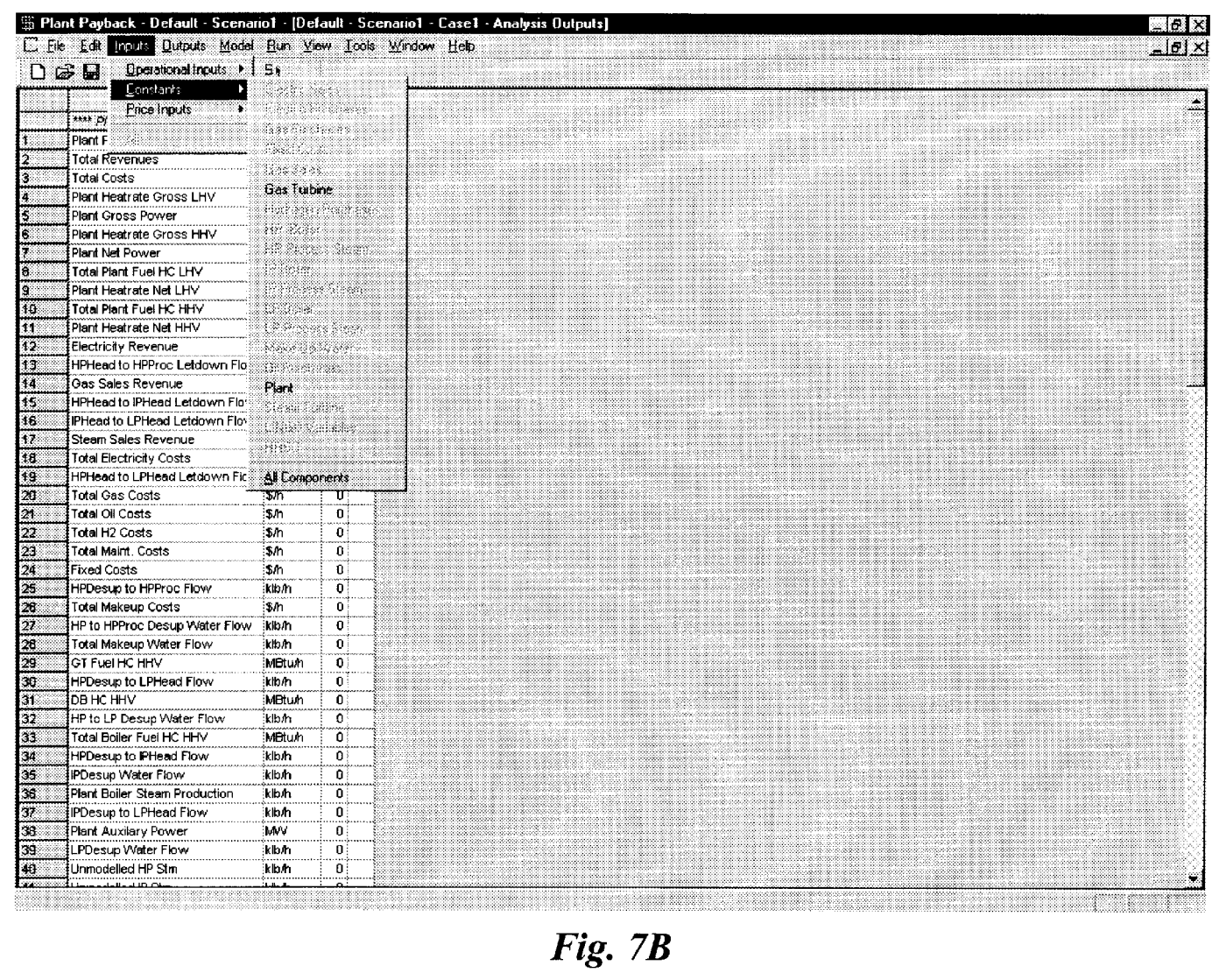
Figure 7C:
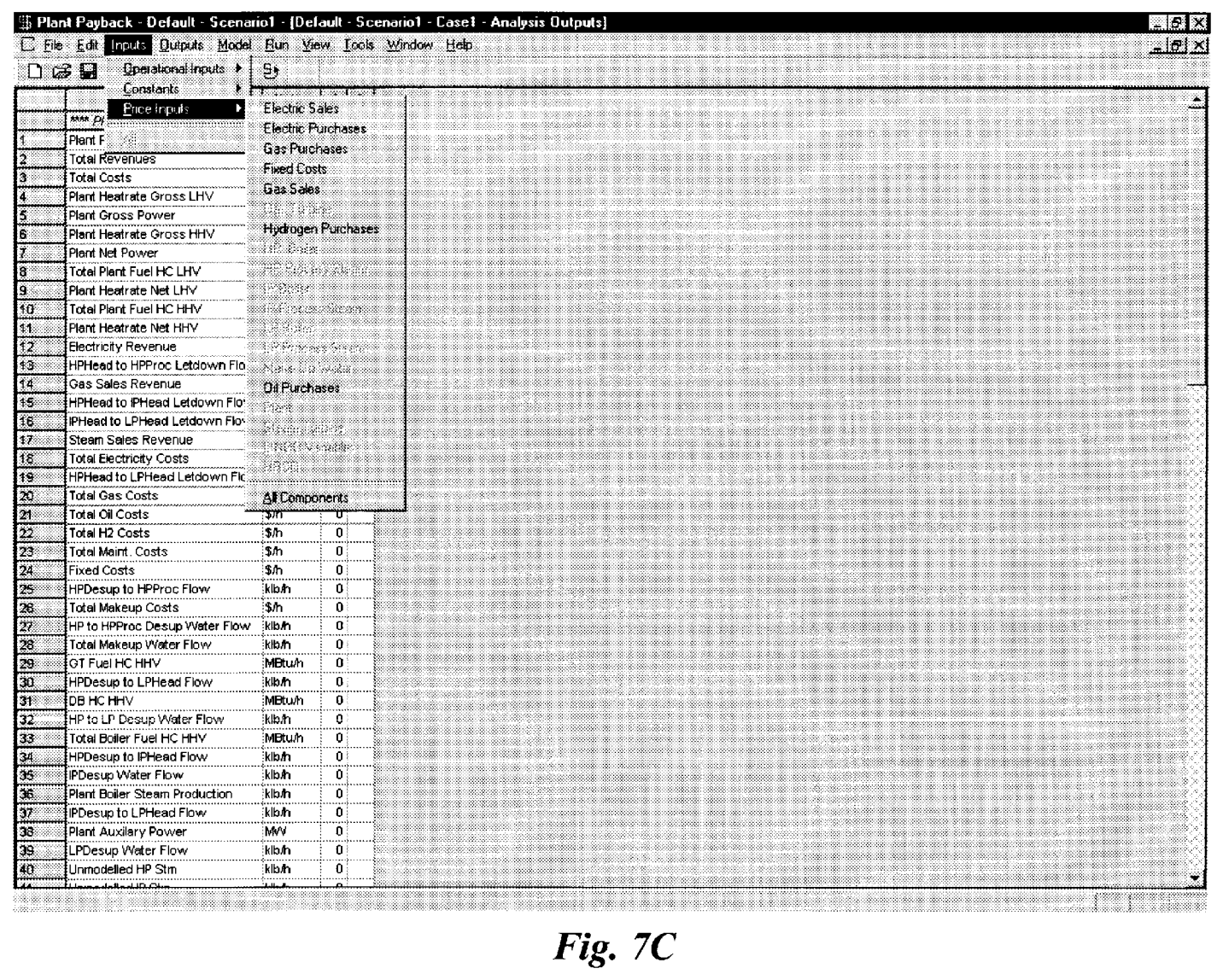
Figure 7D:
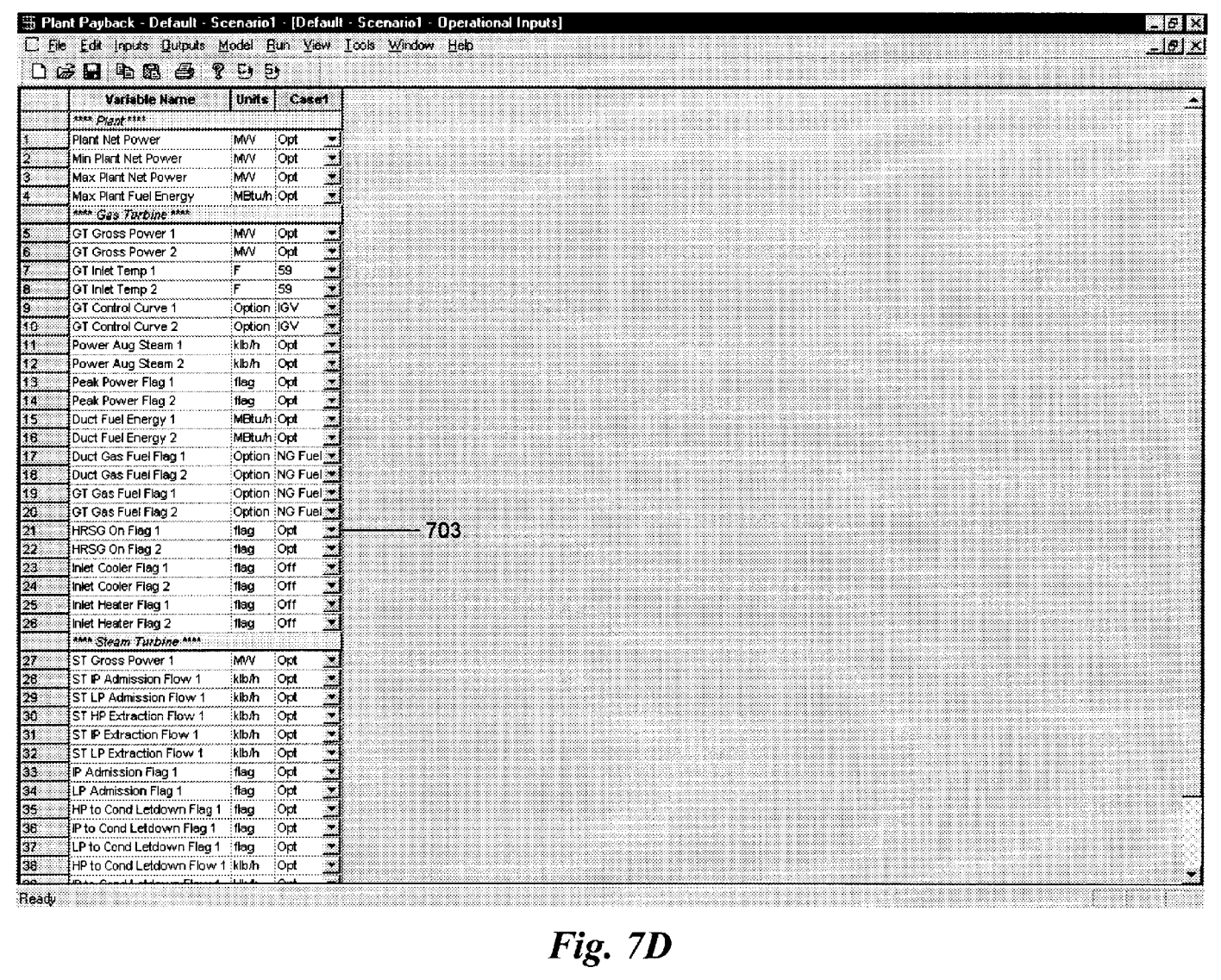

FIGS. 7A–7D illustrate the process by which a user modifies the input variables. The optimization system provides an input menu 701 through which a user can select a type of input variable. The types of input variables include operational inputs, constants, and price inputs. When the user selects the type of input variable, then the optimization system displays a menu 702 of the components to which the selected type of input variables applies. FIGS. 7B–7C illustrate the component menus for the constant and price inputs input variable types. Grid 703 of FIG. 7D contains the operational variables for all the components. A user can set the values for the operational variables by modifying the column labeled "Case1."

Figure 8A:
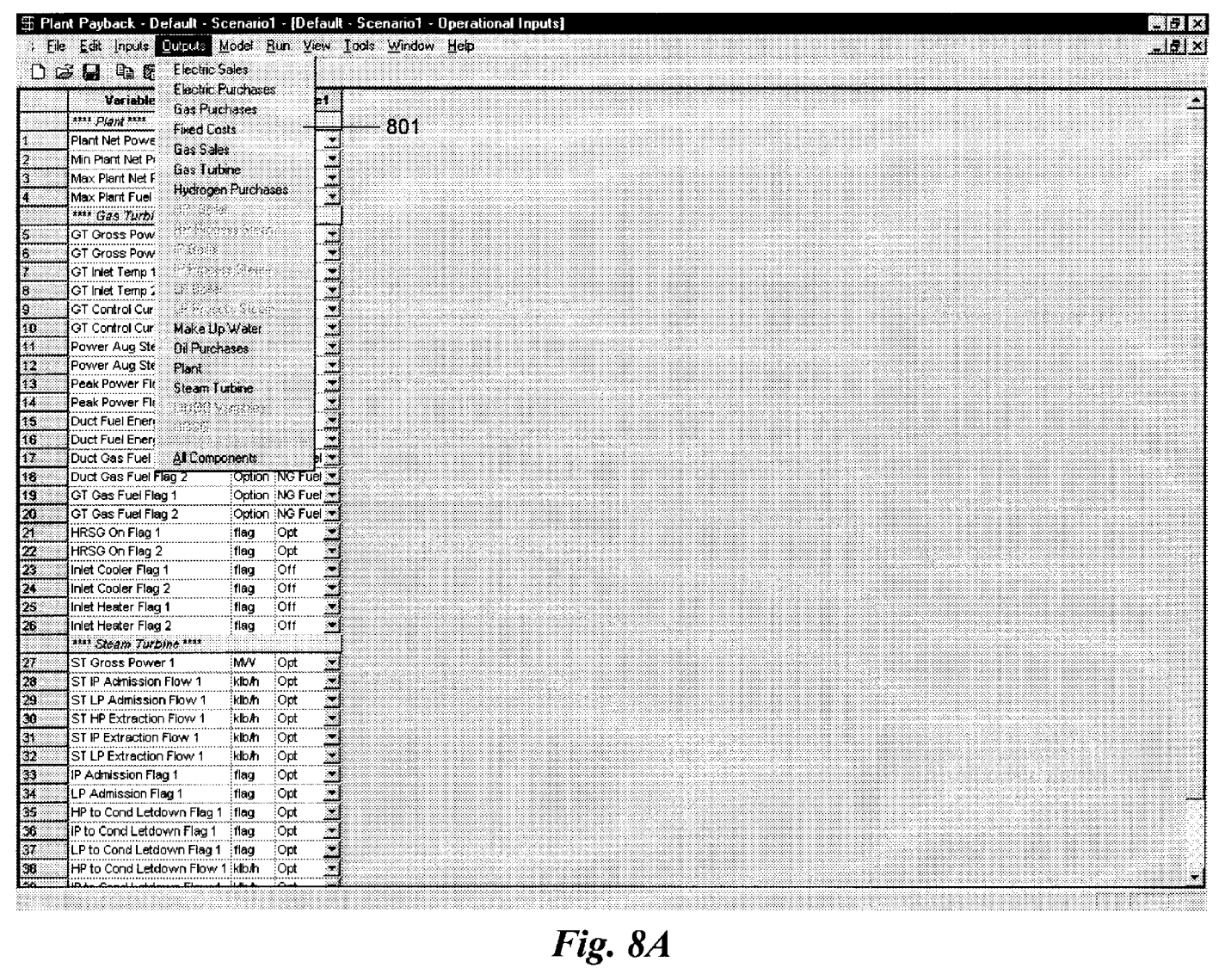

FIGS. 8A–8B illustrate the process by which a user can view the output variables. A user indicates to run the optimization process by selecting the run function. In response, the optimization system updates the output variables. The user can view the output variables by selecting the output menu 801. The menu allows the user to select the output variables for a specific component or all the components. Grid 802 of FIG. 8B illustrates the display of output variables for the plant component.

Figure 9:
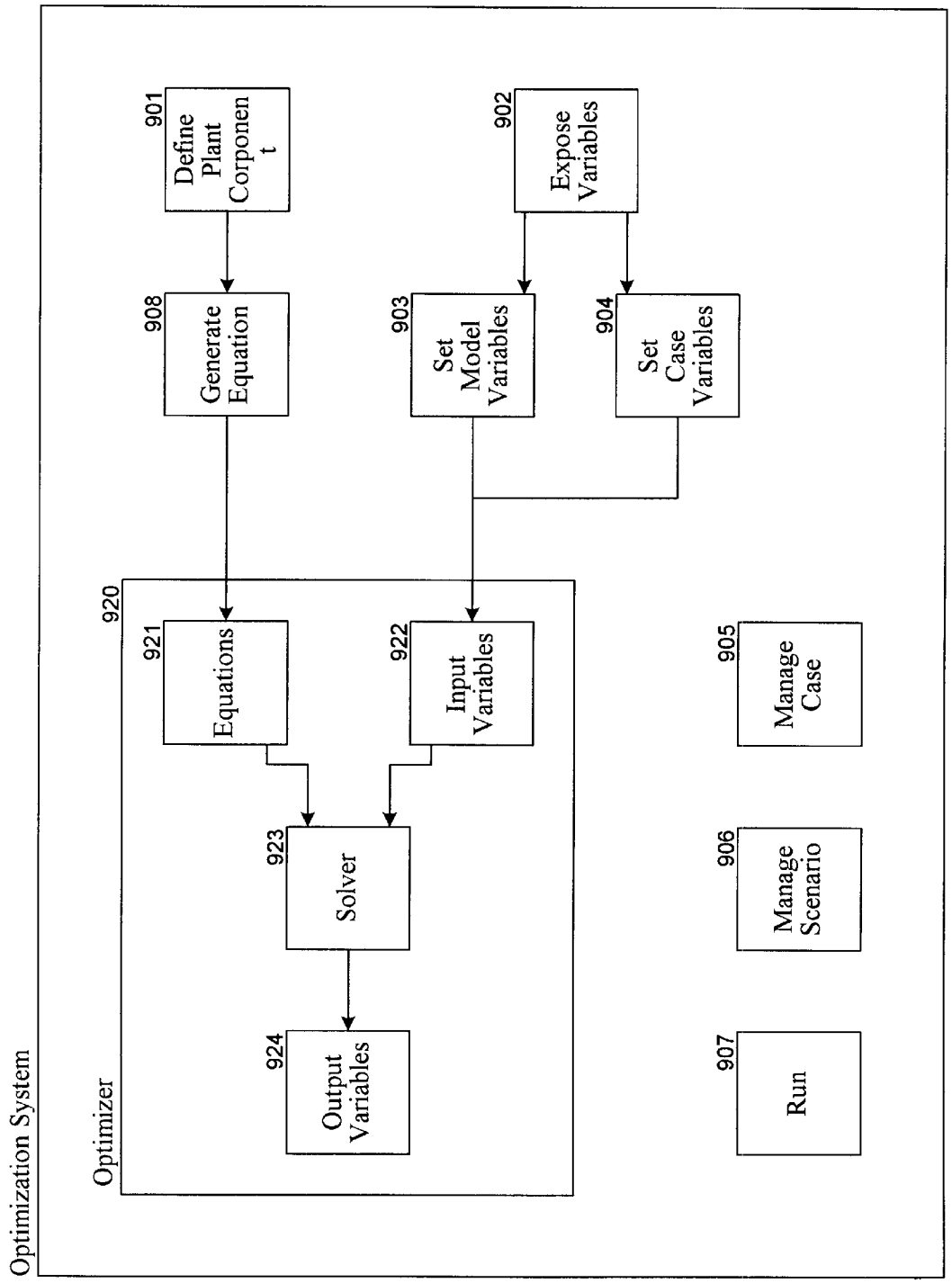
FIG. 9 is a block diagram illustrate the components of the optimization system in one embodiment.

FIG. 9 is a block diagram illustrating the components of the optimization system in one embodiment. The optimization system may be implemented on a conventional at computer system that may include a central processing unit, memory, input devices (e.g., keyboard and pointing device), output devices (e.g., display devices), and storage devices (e.g., disk drives). The memory and storage devices are computer-readable media that may contain computer instructions that implement the optimization system. In addition, the data structures (e.g., organization of the input variables) may be stored on a computer-readable media. One skilled in the art will appreciate that the concepts of the optimization system can be used in many different environments. For example, the optimization system may be provided as an application running on the server that is accessible by clients via the Internet. The optimization system includes a define component module 901, an expose variables module 902, a set model variables module 903, a set case variables module 904, a manage case module 905, a manage scenario module 906, a run module 907, a generate equation module 908, and an optimizer module 920. The define component module allows the user to specify the configuration and economic components of the combined-cycle power plant. The expose variable module allows the user to indicate which variables should be exposed. The output of the exposed variable module is used to control the setting of the model variables and case variables. The set model variable module allows the user to set the model variables that are exposed. The set case variable module allows the user to set the case variables that are exposed. The manage case and manage scenario modules are used to perform management functions on the cases. The optimization system allows a user to group multiple cases that may be related in some way into scenarios. For example, a user may define a scenario entitled "winter operations" and have several cases defined within that scenario for evaluating the operation of the power plant under different operating conditions during winter. For example, a scenario may have cases representing the operation of the plant when the ambient temperature is 0° F., 32° F., and 40° F. If the different cases represent different operating periods (e.g., December, January, and February), then the scenario module may combine the results of the cases and present overall results for the scenario. The run module controls of the execution of the optimization process. When a user modifies the plant configuration, the generate equation module updates the equations so that they represent the new configuration. The optimizer module includes equations 921, input variables 922, solver 923, and output variables 924. The solver inputs of the equations in the input variables and generates an optimal set of output variables.

From the above, it will be appreciated that although specific embodiments of the optimization system have been described for purposes of illustration, various modifications may be made without deviating from the spirit and scope of the invention. Accordingly, the invention is not limited except by the appended claims.

What is claimed is:

1. A method in a computer system for determining unspecified operating conditions of a power plant, the method comprising:
   receiving from a user a specification of components of the power plant;
   providing a set of equations to represent a model of operation of the power plant with the specified components, the equations being linear equations, the equations having variables representing operating conditions relating to the components;
   receiving from a user a custom equation to add to the provided set of equations;
   receiving from a user values for specified operating conditions of the power plant;
   providing an objective function representing an operating condition whose value is to be optimized; and
   generating a solution for the set of equations including the custom equation based on the values of the specified operating conditions and the objective function whereby the solution includes values for the unspecified operating conditions.

2. The method of claim 1 wherein the power plant is a combined-cycle power plant.

3. The method of claim 1 wherein the power plant is a cogeneration power plant.

4. The method of claim 1 wherein the power plant is a district heating power plant.

5. The method of claim 1 wherein the power plant includes one or more of a gas turbine, steam turbine, heat recovery steam generator, or boiler.

6. The method of claim 1 wherein the receiving of the specification of the components of the power plant includes
   providing an indication of possible components of the power plant; and
   receiving selection of the components that comprise the power plant.

7. The method of claim 1 wherein a linear equation is a piece-wise linear approximation of a nonlinear equation.

8. The method of claim 1 wherein the objective function represents profit of the power plant.

9. The method of claim 1 wherein an equation of the provided set of equations generically models an operating condition by factoring in effects of various optional components on the operating condition.

10. The method of claim 1 wherein an equation of the provided set of equations models the gross power of a gas turbine by factoring in baseload power as a function of inlet temperature, peak and under fire power, closing of guide vanes, and augmentation steam.

11. The method of claim 1 wherein an equation of the provided set of equations models the heat recovery steam generator by factoring in reference values of steam flow, gas turbine exhaust temperature, gas turbine exhaust energy, gas turbine exhaust flow, and duct burner fuel.

12. The method of claim 1 wherein the specified components include economic conditions.

13. A method in a computer system for grouping modeled operating conditions of a plant, the method compressing:
   providing a set of equations to model the plant;
   for each of a plurality of scenarios,
      for each of a plurality of cases within the scenario,
         specifying values for operating conditions of the plant for the scenario; and
         generating a solution for the set of equations for the case based on the specified values; and
      outputting for the scenario the generated solutions for the cases associated with the scenario.

14. The method of claim 13 including combining the generated solutions for cases of a scenario to generate an overall solution for the scenario.

15. The method of claim 13 wherein the plant is a power plant.

16. The method of claim 13 wherein a case includes a custom equation provided by a user.

17. The method of claim 13 including receiving from a user a selection of which operating conditions should be exposed for modification.

18. A computer-readable medium for controlling a computer system to determine operating conditions of a power plant, by a method comprising:
   receiving from a user a specification of components of the power plant;
   providing a set of equations to represent a model of operation of the power plant with the specified components, the equations having variables representing operating conditions relating to the components;
   receiving from a user a custom equation to add to the provided set of equations;

receiving from a user an indication of the operating conditions that are to be exposed;

displaying an indication of the exposed operating conditions;

receiving from a user a value for one or more exposed operating conditions of the power plant, wherein a user can provide a value only for an operating condition that is exposed; and generating a solution for the provided set of equations and the received custom equation based on the values of the exposed operating conditions.

19. The computer-readable medium of claim 18 wherein the power plant is a combined-cycle power plant.

20. The computer-readable medium of claim 18 wherein the power plant is a cogeneration power plant.

21. The computer-readable medium of claim 18 wherein the power plant is a district heating power plant.

22. The computer-readable medium of claim 18 wherein the power plant includes one or more of a gas turbine, steam turbine, heat recovery steam generator, or boiler.

23. The computer-readable medium of claim 18 wherein the receiving of the specification of the components of the power plant includes providing an indication of possible components of the power plant; and receiving selection of the components that comprise the power plant.

24. The computer-readable medium of claim 18 wherein the provided set of equations includes a linear equation that is a piece-wise linear approximation of a nonlinear equation.

* * * * *